_United States Patent_ [19]

Hopkins et al.

[11] Patent Number: 4,560,386
[45] Date of Patent: Dec. 24, 1985

[54] ONE-BATH METHOD FOR PRODUCING TONE-IN-TONE DYEINGS ON SUEDED WOOL- OR FUR-BEARING SKINS

[75] Inventors: Tony A. Hopkins, Basel; Rudolf Seitz, Ormalingen, both of Switzerland

[73] Assignee: Sandoz Ltd., Basel, Switzerland

[21] Appl. No.: 590,478

[22] Filed: Mar. 16, 1984

[30] Foreign Application Priority Data

Mar. 21, 1983 [DE] Fed. Rep. of Germany ....... 3310153

[51] Int. Cl.$^4$ ............................. D06P 1/38; D06P 3/30
[52] U.S. Cl. ............................................. 8/437; 8/404; 8/529; 8/543; 8/682; 8/683; 8/686; 8/690; 8/917
[58] Field of Search ................... 8/437, 529, 543

[56] References Cited

U.S. PATENT DOCUMENTS 3,972,675  8/1976  Schwank ................................. 8/584
4,452,602  6/1984  Puntener et al. ....................... 8/404

FOREIGN PATENT DOCUMENTS

| 22067 | 1/1981 | European Pat. Off. . |
| 947647 | 1/1964 | United Kingdom . |
| 1001836 | 8/1965 | United Kingdom . |
| 1037892 | 8/1966 | United Kingdom . |

_Primary Examiner_—A. Lionel Clingman
_Attorney, Agent, or Firm_—Gerald D. Sharkin; Richard E. Vila; Thomas C. Doyle

[57] ABSTRACT

Disclosed is a method for dyeing sueded wool- or fur-bearing skins tone-in-tone in a single bath and in one step. The dyeing is carried out with reactive dyestuffs bearing at least one reactive group selected from acryloylimino, halogenoacryloylimino and $\beta$-halogenopropionylimino, in the presence of non-ionic or anionically modified polyalkoxylated surfactants.

21 Claims, No Drawings

ONE-BATH METHOD FOR PRODUCING TONE-IN-TONE DYEINGS ON SUEDED WOOL- OR FUR-BEARING SKINS

The present invention relates to a one-bath dyeing process for sueded wool- or fur-bearing skins, particularly to such a process which enables the suede or leather and the fur wool or hair to be dyed tone-in-tone.

The dyeing of sueded wool- or fur-bearing skins presents a difficult problem since the wool or hair on one side and the leather on the other side possess different dyeing properties due to their differing protein structures. Although it has been attempted to dye sueded wool- or fur-bearing skins in a single bath, the resulting dyeings were not genuinely tone-in-tone. Usually wool or fur and suede are dyed separately by a two bath method using different types of dyestuff under different dyeing conditions. However, not only is the two-bath dyeing method time-, energy- and water-consuming, but often it does not give satisfactory tone-in-tone dyeings. Minor changes in dyeing conditions, e.g. pH, temperature and water hardness can lead to differences between the shade of the wool or fur and that of the suede.

It has now been found that sueded wool- or fur-bearing skins can be dyed in genuine tone-in-tone shades by a one-bath one-step dyeing method.

Accordingly, the present invention provides a method for dyeing sueded wool- or fur-bearing skin material tone-in-tone in a single bath and in one step which comprises treating the material with an aqueous dyeing liquor containing
(i) a reactive dyestuff bearing at least one reactive group selected from acryloyl, halogenoacryloyl and $\beta$-halogenopropionyl groups which are bound through an unsubstituted or substituted imino group, or a mixture of such dyestuffs, and
(ii) a non-ionic or anionically modified polyalkoxylated surfactant or a mixture of such compounds.

In the above groups, "halogeno" is used to represent bromo and chloro, preferably chloro.

By "sueded wool- or fur-bearing skins" are meant sueded leather bearing fur, wool or hair of various origins. As examples of such skins may be given materials obtained from lamb, sheep, rabbit, noble fur animal, cattle, calf or goat skins. The sueded leather is obtained according to known methods, the leather being mineral or vegetable tanned, preferably mineral tanned with mineral salts such as aluminium, chrome, iron and zirconium salts. Preferably the leather is obtained by chrome tanning, or aluminium tanning followed by chrome retanning. Preferred material is sheep shearling suede i.e. wooled sheepskin as used for garments or boots.

The dyeing process of the invention is conveniently carried out at a temperature from 25° to 75° C., preferably from 50° to 65° C. The goods to liquor ratio is not critical. Preferably the dyeing is carried out at a goods to liquor ratio from 1:3 to 1:40, more preferably from 1:5 to 1:20. Dyeing according to the invention is advantageously performed in a period from about 1 to 3 hours.

The pH of the dyeing liquor is adjusted to values within the range usually employed for dyeing shearling suede in the two-bath method. Preferably the dyeing liquor is adjusted to a pH from 5 to 9, more preferably 5 to 7. At the end of the dyeing, the dyeing liquor is acidified to a pH from 3.5 to 4.5, e.g. by addition of formic acid, and fixation is carried out.

Suitable dyestuffs (i) used according to the process of the invention include anionic azo dyestuffs which contain, in addition to at least one of the indicated reactive groups, at least one sulpho group in the free acid or salt form, monoazo dyestuffs being preferred. More preferred dyestuffs (i) are metal complexes of such monoazo dyestuffs, preferably 1:2 metal complexes, particularly those containing a single sulpho group in the free acid or salt form. The dyestuffs (i) may advantageously contain from 1 to 4 reactive groups as stated above, the preferred dyestuffs being those bearing only one reactive group which is preferably bound on an aryl group of the molecule.

The imino group linking the reactive group to the dyestuff molecule may be substituted e.g. by methyl or ethyl. Preferably the imino linkage group is unsubstituted.

Preferred dyestuffs (i) are the metal complexes of metallisable monoazo dyestuffs of formula I

$$E_1-A_1-N=N-B_1D_1 \qquad I$$

in which
$A_1$ is a substituted or unsubstituted phenylene or naphthylene radical
$B_1$ is the residue of a coupling component which couples in ortho or vicinal position to $D_1$
$D_1$ is OH, $NH_2$ or $C_{1-4}$alkylamino in ortho position to the azo group, and
$E_1$ is OH, —COOH or —OCH$_2$—COOH in ortho position to the azo group
the metal complex molecule containing a single sulpho group attached to a carbon atom of an aryl radical present in $A_1$ or $B_1$, and from 1 to 4 acryloyl, halogenoacryloyl or $\beta$-halogenopropionyl groups bound through an imino group which may be further substituted.

Preferably the metal complexes of compounds of formula I are free from carboxylic acid groups. Preferred metal complexes are the asymmetric 1:2 metal complexes, particularly the chromium complexes.

A preferred group of asymmetric 1:2 metal complexes is represented by the compounds of formula Ia in the free acid from

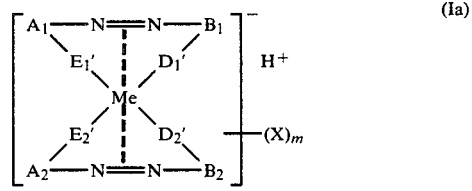

in which
$A_1$ and $B_1$ are as defined above
$A_2$ has, independently, one of the significances of $A_1$
$B_2$ has, independently, one of the significances of $B_1$
each of $D_1'$ and $D_2'$, independently, is —O—, —NH— or —N—$C_{1-4}$alkyl in ortho position to the azo group
each of $E_1'$ and $E_2'$, independently, is —O—, —COO— or —OCH$_2$—COO— in ortho position to the azo group
Me is cobalt or chromium
each X, independently, is acryloylamino, halogenoacryloylamino or $\beta$-halogenopropionylamino, and
m is 1, 2, 3 or 4 the molecule containing a single sulpho group attached to a carbon atom of an aryl radical present in $A_1$, $B_1$, $A_2$ or $B_2$.

In the compounds of formula Ia, each X is preferably bound to a carbon atom of an aryl radical present in $A_1$, $B_1$, $A_2$ and $B_2$. One or two X groups may be attached to the same aryl as the sulpho group.

As examples of the substituents, other than the one sulpho group present in the dyestuff and the reactive groups represented by X, which may be present in the phenylene and naphthylene radicals as $A_1$ and $A_2$, there may be mentioned halogen atoms such as chlorine atoms, $C_{1-4}$alkyl, $C_{1-4}$alkoxy, nitro, $C_{1-4}$alkylsulphone, sulphamoyl, N-$C_{1-4}$alkyl-sulphamoyl, N,N-di($C_{1-4}$alkyl)-sulphamoyl, N-$\beta$-,$\gamma$-,$\omega$-hydroxy-$C_{1-4}$alkyl-sulphamoyl, N-phenyl-sulphamoyl, acylamino and arylazo groups.

A preferred significance for —$A_1$—$E_1'$ is the group of formula (a)

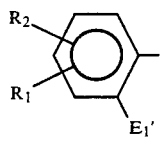
(a)

in which $E_1'$ is as defined above $R_1$ is hydrogen or —$SO_3H$, and $R_2$ is hydrogen, chlorine, nitro, sulphamoyl, N-$C_{1-4}$-alkyl-sulphamoyl, N,N-di($C_{1-4}$alkyl)-sulphamoyl or N-phenylsulphamoyl.

A preferred significance for —$A_2$—$E_2'$ is the group of formula (b)

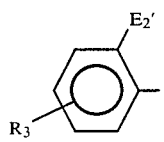
(b)

in which $E_2'$ is as defined above, and $R_3$, independently, has one of the significances of $R_2$.

In formula (b), $R_3$ is preferably in the para position of $E_2'$.

Preferably —$B_1$—$D_1$ and —$B_2$—$D_2$ (or —$B_1$—$D_1'$ and —$B_2$—$D_2'$) are each, independently, a residue of a coupling component of the phenol, naphthol, acetoacetarylide, 5-aminopyrazole, 5-pyrazolone or arylamine, more preferably 1-phenyl-5-pyrzolone or naphthol series.

These coupling components may be substituted and as examples of substitutents which may be present, other than the one —$SO_3H$ group and the reactive groups X present in the dyestuff molecule, there may be mentioned any of the above substituents which may be present in $A_1$ and $A_2$.

—$B_1$—$D_1'$ is preferably the residue of a coupling component of formula ($c_1$) or ($c_2$)

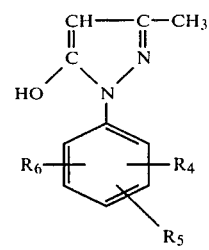
($c_1$)

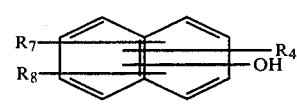
($c_2$)

in which $R_4$ is hydrogen or —$SO_3H$ $R_5$ is hydrogen, chlorine, $C_{1-4}$alkyl $R_6$ is hydrogen, chlorine, $C_{1-4}$alkyl, sulphamoyl, N-$C_{1-4}$alkyl-sulphamoyl, N-$\beta$-hydroxyethylsulphamoyl, $R_7$ is hydrogen, chlorine, bromine, acetyl or sulphamoyl, and $R_8$ is hydrogen, chlorine or amino.

In the formula ($c_2$), the hydroxy group may be in the position 1, respectively 8, or 2 and the substituents $R_4$, $R_7$ and $R_8$ are distributed in one or both ring as known by the man skilled in the art.

—$B_2$—$D_2'$ is preferably the residue of a coupling component of formula (d)

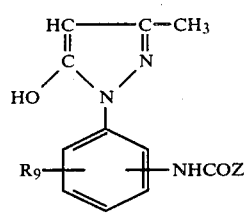
(d)

in which $R_9$ is hydrogen or methyl and Z is $CH_2=CH—$ or $Cl—CH_2—CH_2—$

—NHCOZ being preferably in the meta or para position, more preferably in the para position.

Preferred compounds of formula (Ia) are those containing a single reactive group X.

Particularly preferred metal complexes are the compounds which in the free acid form are represented by formula Ib

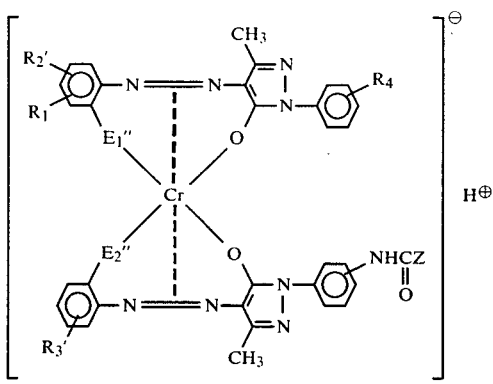

in which
R₁, R₄ and Z are as defined above
R₂' is hydrogen, chlorine or nitro
R₃' is hydrogen, chlorine or nitro, and
each of $E_1''$ and $E_2''$, independently, is —O— or —COO—
provided that one of R₁ and R₄ is —SO₃H and the other is hydrogen, and by formula Ic

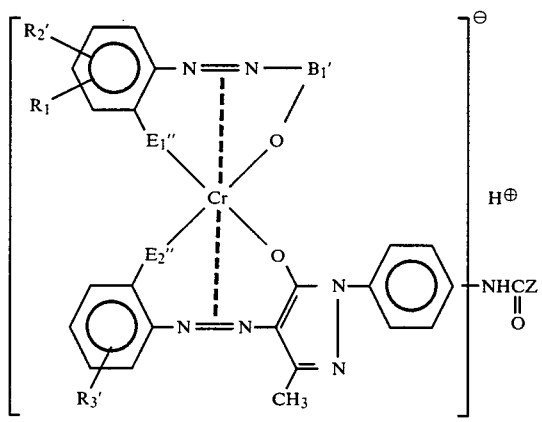

in which
R₁, R₂', R₃', $E_1''$, $E_2''$ and Z are as defined above, and B₁' is the residue of the coupling component of formula (c₂)
the molecule containing a single —SO₃H and the residue —NHCOZ being attached to an aryl group which can be identical to or different from that bearing the —SO₃H group.

In the compounds of formula Ib, R₃' is preferably chlorine or nitro.

In the compounds of formula Ic, the single sulpho group of the molecule is preferably in B₁'.

The dyestuffs (i) may be prepared according to known methods. Many of the dyestuffs (i) are known and are disclosed e.g. in UK patent specification Nos. 947,647; 1,001,836 and 1,037,892.

The dyestuffs (i) may be used in the free acid or salt form. Suitable salts are for example the alkali metal, ammonium or substituted ammonium salts.

The amount of dyestuffs (i) to be used depends on the desired tinctorial strength and is within the usual range as used for dyeing leather.

Suitable compounds (ii) which can be used according to the process of the invention are the reaction products of fatty alcohols, phenols, C₁₋₁₈alkyl phenols, di-C₁₋₁₂alkyl-phenols or fatty acids with either ethylene oxide or propylene oxide or with ethylene oxide and propylene oxide in any sequence, which may be modified with anionic groups e.g. by sulphation, carboxymethylation or phosphating. Preferably, such compounds (ii) are water-soluble. Preferred surfactants (ii) are (A) the reaction products of a C₄₋₂₄alcohol, preferably an aliphatic saturated or unsaturated C₆₋₁₆alcohol, e.g. tetramethylnonyl alcohol, lauryl, myristyl, cetyl, stearyl, arachidyl, behenyl or oleyl alcohol or 2-C₁₋₈alkyl substituted alcohol, with 1 to 25 mols ethylene oxide, preferably 4-15 mols, especially 6-12 mols ethylene oxide;

(B) the carboxymethylated derivatives of the reaction products (A). The carboxymethylation of compounds (A) may be carried out according to known methods, e.g. employing chloroacetic acid or a salt thereof;

(C) the phosphated derivatives of the reaction products (A), e.g. the phosphoric acid esters or semi-esters obtained from the products (A) by reaction with P₂O₅ according to known methods; and (D) the sulphated derivatives of the reaction products (A), e.g. compounds of formula

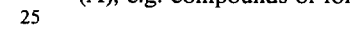

in which
R is C₄₋₂₄alkyl or alkenyl
n is 1 to 25, and
Y is hydrogen or an alkali metal cation.

Such compounds are known and are disclosed e.g. in "Tensid-Taschenbuch" from H. Stache, Ed. C. Hauser, Munich/Vienna 1979.

Compounds (ii) are preferably used in an amount from 0.5 to 5.0 g/l, more preferably from 1 to 3 g/l.

According to a preferred embodiment of the process of the invention, the sueded wool- or fur-bearing skins are dyed with an aqueous dyeing liquor containing as compound (ii) a mixture of one or more non-ionic compounds with their anionically modified derivatives. A particularly preferred mixture is that containing an ethoxylated alcohol (A) and its carboxymethylated derivative.

When a mixture of non-ionic anionically modified polyalkoxylated compounds (ii) is used, preferably the weight ratio of the non-ionic to the anionically modified is from 1:4 to 4:1, particularly about 1:1.

In addition to the dyestuffs (i) and the surfactants (ii), the aqueous dyeing liquor may contain further additives, e.g. such having affinity for the dyestuffs or the fibre material such as aromatic sulphonic acids or nitrogen atom-containing polyglycol ethers, or fat liquoring agents such as those based on modified or emulsified natural or synthetic oils, fats or waxes.

In one particular embodiment of the process of the invention, the surfactant (ii) is added to the liquor before the reactive dyestuff (i).

Not only is the dyeing process of the invention particularly advantageous on the economical aspect but also the resulting dyeings are tone-in-tone and possess good general fastnesses.

The following Examples in which all parts and percentages are by weight and all temperatures are in degrees Centigrade, serve to further illustrate the invention.

EXAMPLE 1

100 Parts chrome tanned buffed shearling suede which is in a state to be dyed are treated at 60° in an aqueous bath of 2000 parts containing 2 parts sodium carbonate, 1 part of an agent having affinity for fibres based on a sodium aromatic sulphonic acid salt and 1 part of a mixture of surfactants and formaldehyde. After a treatment time of 30–60 minutes, there are further added 2 parts of an agent having affinity for dyes and based on an addition product of 10 mols ethylene oxide on an alkyl ($C_{12}$) amine and 4 parts of the reaction product of chloroacetic acid with tetramethylnonylhexapolyglycol ether. The shearling suede is further treated for 15 minutes and then 2 parts of a weakly anionic fat liquoring agent based on a fatty acid derivative and 2 parts of the metal complex dye of Example 79 of UK patent specification No. 947 647 are added to the treatment bath. Dyeing is effected for 30 to 60 minutes followed by a fixation treatment with 1–6 parts formic acid 85% for 30–60 minutes in the same bath at the constant temperature of 60°.

A shearling suede dyed in a tone-in-tone shade with a high levelness and brightness (fur and leather) is thus obtained.

EXAMPLE 2

By following the procedure of Example 1 but using the dyes of UK patent specification Nos. 947 647, 1 037 892 and 1 001 836, tone-in-tone dyeings with the same properties are obtained.

Instead of the reaction product of chloroacetic acid with tetramethylnonylhexapolyglycol ether, a 1:1 mixture of oleyl alcohol ethoxylated with 12 mols ethylene oxide and its carboxymethylated derivative can be used.

What is claimed is:

1. A method for dyeing sueded tanned wool- or fur-bearing skin material tone-in-tone which comprises treating the material in a single bath and in one step with an aqueous dyeing liquor containing
   (i) a reactive dyestuff bearing at least one reactive group selected from acryloyl, halogenoacryloyl and β-halogenopropionyl groups which are bound through an unsubstituted or substituted imino group, or a mixture of such dyestuffs, and
   (ii) a non-ionic or anionically modified polyalkoxylated surfactant or a mixture of such compounds.

2. A method according to claim 1, in which the dyestuff (i) is a metal complex of an azo dyestuff containing additionally at least one sulpho group.

3. A method according to claim 1, in which the dyestuff (i) is a metal complex of a metallisable monoazo dyestuff of formula I

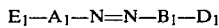

in which
   $A_1$ is a substituted or unsubstituted phenylene or naphthylene radical
   $B_1$ is the residue of a coupling component which couples in ortho or vicinal position to $D_1$
   $D_1$ is OH, $NH_2$ or $C_{1-4}$alkylamino in ortho position to the azo group, and
   $E_1$ is OH, —COOH or —$OCH_2$—COOH in ortho position to the azo group
the metal complex molecule containing a single sulpho group attached to a carbon atom of an aryl radical present in $A_1$ or $B_1$, and from 1 to 4 acryloyl, halogenoacryloyl or β-halogenopropionyl groups bound through an imino group which may be further substituted.

4. A method according to claim 1, in which the dyestuff (i) is an asymmetric 1:2 metal complex of formula Ia

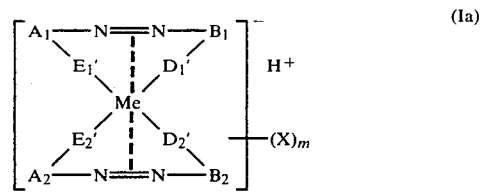

in which
   each of $A_1$ and $A_2$, independently, is a substituted or unsubstituted phenylene or naphthylene radical
   each of $B_1$ and $B_2$, independently, is the residue of a coupling component which couples in ortho or vicinal position to $D_1$
   each of $D_1'$ and $D_2'$, independently, is —O—, —NH— or N-$C_{1-4}$alkyl in ortho position to the azo group
   each of $E_1'$ and $E_2'$, independently, is —O—, —COO— or —$OCH_2$—COO— in ortho position to the azo group
   Me is cobalt or chromium
   each X, independently, is acryloylamino, halogenoacryloylamino or β-halogenopropionylamino, and
   m is 1, 2, 3 and 4
the molecule containing a single sulpho group attached to a carbon atom of an aryl radical present in $A_1$, $B_1$, $A_2$ or $B_2$.

5. A method according to claim 1, in which the dyestuff (i) is a compound which in the free acid form is represented by formula Ib

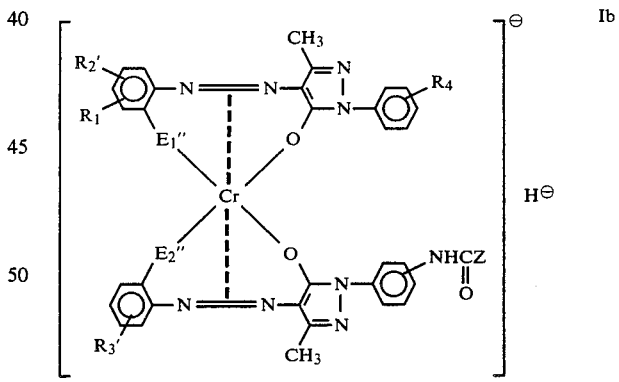

in which
   $R_1$ is hydrogen or —$SO_3H$
   $R_2'$ is hydrogen, chlorine or nitro
   $R_3'$ is hydrogen, chlorine or nitro
   each of $E_1''$ and $E_2''$, independently, is —O— or —COO—
   $R_4$ is hydrogen or —$SO_3H$, and
   Z is $CH_2$=CH— or Cl—$CH_2CH_2$—
provided that one of $R_1$ and $R_4$ is —$SO_3H$ and the other is hydrogen.

6. A method according to claim 1, in which the dyestuff (i) is a compound which in the free acid form is represented by formula Ic

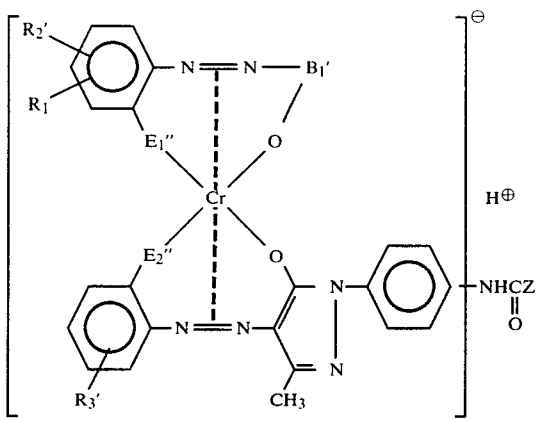

in which
R$_1$ is hydrogen or —SO$_3$H
R$_2'$ is hydrogen, chlorine or nitro
R$_3'$ is hydrogen, chlorine or nitro
each of E$_1''$ and E$_2''$, independently, is —O— or —COO—
Z is —CH$_2$=CH— or Cl—CH$_2$—CH$_2$—, and
B$_1$ is the residue of the coupling component of formula (c$_2$)

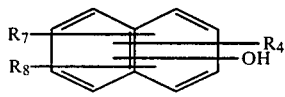

in which
R$_4$ is hydrogen or —SO$_3$H
R$_7$ is hydrogen, chlorine, bromine, acetyl or sulphamoyl, and
R$_8$ is hydrogen, chlorine or amino,
provided that one of R$_1$ and R$_4$ is —SO$_3$H and the other is hydrogen, and the residue —NHCOZ being attached to an aryl group which can be identical to or different from that bearing the —SO$_3$H group.

7. A method according to claim 1, in which the surfactant (ii) is selected from
(A) the reaction products of a C$_{4-24}$alcohol with 1 to 25 mols ethylene oxide,
(B) the carboxymethylated derivatives of the reaction products (A);
(C) the phosphated derivatives of the reaction products (A); and
(D) the sulphated derivatives of the reaction products (A).

8. A method according to claim 7, in which the reaction product (A) is the reaction product of an aliphatic saturated or unsaturated C$_{6-16}$alcohol with 1 to 25 mols ethylene oxide.

9. A method according to claim 7, in which the surfactant (ii) is a mixture of non-ionic reaction products (A) and their anionically modified derivatives.

10. A method according to claim 9, in which the weight ratio of the non-ionic to the anionically modified is from 1:4 to 4:1.

11. A method according to claim 1, in which the one-bath one-step dyeing is effected at a temperature from 25° to 75° C.

12. A method according to claim 2 in which the pH of the dyeing liquor is 5 to 9 and the temperature is from 25° to 75° C.

13. A method according to claim 4 in which the pH of the dyeing liquor is 5 to 9 and the temperature is from 25° to 75° C.

14. A method according to claim 6 in which the pH of the dyeing liquor is 5 to 9 and the temperature is from 25° to 75° C.

15. A method according to claim 7 in which the pH of the dyeing liquor is 5 to 9 and the temperature is from 25° to 75° C.

16. A method according to claim 1 wherein the surfactant (ii) is present in the dyeing liquor in an amount of from 0.5 to 5.0 g/l.

17. A method according to claim 4 wherein the surfactant (ii) is present in the dyeing liquor in an amount of from 0.5 to 5.0 g/l.

18. A method according to claim 7 wherein the surfactant (ii) is present in the dyeing liquor in an amount of from 0.5 to 5.0 g/l.

19. A method according to claim 14 wherein the surfactant is present in the dyeing liquor in an amount of from 0.5 to 5.0 g/l.

20. A method according to claim 19, in which the surfactant (ii) is selected from
(A) the reaction products of a C$_{4-24}$alcohol with 1 to 25 mols ethylene oxide,
(B) the carboxymethylated derivatives of the reaction products (A);
(C) the phosphated derivatives of the reaction products (A); and
(D) the sulphated derivatives of the reaction products (A).

21. A method according to claim 1 in which the surfactant (ii) is a product of reacting a fatty alcohol, phenol, C$_{1-18}$alkyl phenol, di-C$_{1-12}$alkyl phenol or fatty acid with ethylene oxide or propylene oxide or with ethylene oxide and propylene oxide in any sequence, or a derivative produced by sulphating, carboxymethylating or phosphating such a product.

* * * * *